United States Patent Office 3,464,854
Patented Sept. 2, 1969

3,464,854
METHOD OF COATING AND COMPOSITION THEREFOR
Justin C. Bolger, Needham, Mass., assignor to Amicon Corporation, Lexington, Mass., a corporation of Massachusetts
No Drawing. Continuation of application Ser. No. 317,807, Oct. 21, 1963. This application May 29, 1967, Ser. No. 642,241
Int. Cl. B44d *1/38, 1/46*
U.S. Cl. 117—160        6 Claims

ABSTRACT OF THE DISCLOSURE

A coating composition, and method of using such composition, which consists of a non-alkaline filler, a water-inert amine catalyst and an epoxy resin binder, all of the foregoing being slurried in sufficient water to obtain surprisingly good distribution of the binder on the filler and consequently achieving extraordinarily beneficial properties.

---

This application is a continuation of Ser. No. 317,807 filed Oct. 21, 1963, now abandoned.

This invention relates to a method of making durable coatings and to a composition for making such coatings having very high content of filler particles.

It has previously been proposed to employ a small quantity of an epoxy resin as a binder for coarse particles such as sand in making castings from aqueous sand slurries. Such slurries have not been suitable, however, for forming a durable continuous coating on a substrate.

One object of the present invention is to provide a method and composition for forming on a substrate a durable continuous coating having a high proportion of inert filler particles.

Another object is to provide a composition having an apparent viscosity suitable for coating on a substrate by brushing, dipping, spraying, etc., in the form of an aqueous dispersion containing a finely divided solid filler which is inert to the remaining ingredients of the composition, together with a very small quantity of an epoxy resin binder and an amine curing agent therefor.

Epoxy resin compositions containing fillers for coating a variety of substrates are well known. In general, such coating compositions have been of two types: (1) those containing no volatile ingredient as a liquid carrier vehicle; these are used primarily for very thick coatings; and (2) solutions of epoxy resins in volatile organic solvents. In the case of the first type of composition, a maximum of about 40% by volume of filler may be present. Attempts to employ larger proportions of filler lead to improper wetting of the filler particles and a sharp decrease in desirable physical properties of the finished, cured coating. In addition, the viscosity of the composition before curing becomes so high that processing and handling of the composition becomes exceedingly difficult. While it is possible in the case of compositions of the second type in which a volatile organic solvent is present to employ a somewhat higher proportion of filler particles in the mix, it has been found, however, that in order to provide an acceptable degree of durability in the finished, cured coating, it is essential that the amount of epoxy resin be at least 15% by weight of the filler in any such solution coating composition.

It has now been found that it is possible to produce coatings having excellent durability and strength, having a large proportion of filler, and containing only a very small quantity of epoxy resin ranging from 0.7% to 10% by weight of the filler by employing as the coating composition an aqueous dispersion containing a very large proportion of filler particles having a particle size less than 100 mesh, the ratio of water to filler being from 10:1 to 1:1 by volume. For best results, the apparent viscosity of the coating composition at high shear rates (above 1000 reciprocal seconds) should be in the range from 40 to 1000 centipoises. The coating composition should also have thixotropic (time dependent) flow behavior and should have a yield stress greater than about 5 dynes/cm.$^2$.

The fillers which may be employed in the composition include the water insoluble particulate materials which are not excessively alkaline (i.e. water slurries of which exhibit a pH less than 10), which are inert to the remaining ingredients of the composition and which have a particle size less than 100 mesh (i.e. particles which pass a 100 mesh screen). Among suitable fillers are finely divided metals, such as powdered aluminum, copper, stainless steel, etc.; silica and silicates, such as sand, quartz, glass, colloidal silica, perlite, vermiculite, talc asbestos, mica; and aluminosilicates, such as kaolin, bentonite, pyrophyllite, attapulgite, and montmorillonite, whether calcined or in the normal hydrous state; organic and inorganic pigments, such as phthalocyanine pigments, chrome yellow, carbon black, etc.; various metal oxides, such as titanium dioxide, alumina, and magnesium oxide, graphite; and carbides, such as silicone carbide, boron carbide, and beryllium carbide, etc. Mixtures of any two or more of the foregoing may also be employed.

Among the epoxy resins suitable for use in the present invention are those formed by the reaction of Bisphenol-A or polyglycols with epichlorohydrin, or epoxy novolac resins or halogenated epoxy resins. The epoxide equivalents should be such that the resins are normally liquid at room temperature or at temperatures slightly above room temperature. Also suitable for use in the present invention are blends or mixtures of the foregoing resins with up to 40% by weight of the conventional reactive diluents such as butyl glycidyl ether, phenyl glycidyl ether, and the like. Such resins and resin mixtures are readily obtainable from a variety of suppliers under various trade names and designations, such as Epon which is the trademark for a series of resins possessing terminal epoxide groups and ranging from mobile liquids to viscous liquids to solids, the primary difference among the various types being molecular weight, which increases as the identifying number increases. Reference is made to Shell Chemical Company Product Specifications SC:60–146 of November 1960 for a further description of these resins. In the case of those resins or resin mixtures which are themselves extremely viscous, it is usually desirable before preparing the aqueous dispersion of the present invention to mix with them non-reactive water insoluble solvents such as xylene or the like to decrease the viscosity and facilitate ready dispersion of the resin or resin mixture in the water.

In addition to the particulate filler and the epoxy resin, the coating composition must contain as a hardening agent for the resin an amine curing agent which for best results has a low solubility in water, i.e. a solubility of not over 30% by weight in water at 20° C. In addition to having a low solubility in water, the amine curing agent must be chemically inert to water and must be sufficiently active as a curing agent to cure the epoxy resin at a temperature of 110° C. or lower during a period of the order of four to eight hours. A variety of such curing agents are available from various sources under numerous trade means and include not only amines themselves such as dimethylbenzylamine and methane diamine but also amine-resin and amine-glycidyl adducts.

The relative proportions of epoxy resin and of amine curing agent may be varied over a wide range as is well known to those skilled in the art, depending upon the precise identity of the resin and of the curing agent. In general, it is desirable to use an amount of curing agent which is near the upper end of or slightly in excess of the range normally recommended by the supplier.

In preparing the coating composition, the particulate filler is first dispersed or suspended in water, after which a mixture of epoxy resin and amine curing agent is stirred into the dispersion. It is also possible to introduce a part or all of the amine curing agent into the dispersion before the epoxy resin is introduced. However, when a mixture of filler materials of two widely different particle sizes is employed, it is generally desirable that the very fine particle size filler be added to the dispersion after the resin and amine curing agent in order to ensure a more uniform distribution of the resin and curing agent among all of the filler particles.

The extent of agitation required to prepare the coating compositions is not critical, except that the agitation should be vigorous enough to ensure adequate and uniform distribution between the filler particles and the resin and curing agent. Any air which is accidentally entrained during the mixing process is, of course, preferably removed by any conventional procedure such as vacuum degassing, before the compositions are used. Inasmuch as the compositions contain both an epoxy resin and a curing agent, they are not stable over long periods of time and must be used within about six to eight hours after the composition has been prepared.

In the case of filler particles which are difficult to wet with water, it may be desirable to employ as a wetting agent a small quantity of an amine such as ethylenediamine or diethylenetriamine; octadecylamine; or surface active quaternary ammonium compounds such as dimethyldioctadecyl ammonium chloride and the like.

The coating compositions of the present invention are in the form of aqueous dispersions or paints which can be applied to any desired substrate in the same manner as any convention paint, after which they are dried and cured either at room temperature or at elevated temperatures of the order of 40° to 120° C. The use of radiant heat, i.e., using infra red heating lamps, is preferred for best results. Among other methods of application are brushing, spraying, dipping, roller coating, doctoring, etc.

The finished, cured coatings display a remarkably high filler content, which makes it possible by suitable selection of filler to achieve remarkably high heat resistance, thermal stability, radiation stability, and reflectivity or opacity, as well as high abrasion resistance.

While the theory of operation of the present invention may not be fully understood and applicants do not wish to be bound by the following explanation, it is believed that filler materials which are non-alkaline, i.e. which are either acidic, neutral, or only very slightly alkaline in aqueous suspension of dispersion, have surfaces which tend to absorb certain amines from the aqueous medium. Accordingly, if there is added to an aqueous dispersion or suspension of the filler particles a small quantity of a liquid mixture of an epoxy resin with an amine curing agent which is only slightly soluble in water, the mixture of resin and curing agent tends to concentrate by adsorption on the surface of the filler particles. Furthermore, when the solid particles come into contact with each other as the water is removed during the drying and curing stage, capillary forces promote accumulation of the resin at the points of mutual contact of the particles, resulting in a product of high strength containing a minimum quantity of resin.

The following specific examples are intended to illustrate more clearly the nature of the present invention without serving as a limitation upon its scope.

EXAMPLE 1

Approximately 30 milliliters of water were added to a 360 milliliter Waring Blendor jar. To this was added 60 grams of boron carbide powder having a particle size less than 100 mesh with moderate stirring to disperse the boron carbide particles in the water. One drop of ethylene diamine was added to the slurry to increase the pH, and to facilitate subsequent wetting of the particles. In a small, separate container, a resin mixture was prepared containing 3.6 grams of an epoxy resin of the Epon series as defined above, 0.54 gram of dimethylaminomethylphenol curing agent and 1.0 gram of toluene. This resin mixture was added slowly with continued moderate agitation (e.g. at 40 to 60 volts input to the Waring Blendor) to the boron carbide water slurry. Since the suspension thickened as the resin mixture was added a small additional quantity of water (e.g. 2 to 4 milliliters) might be needed either during or after the resin addition, in order to end up with a product having the proper consistency. Likewise, one might add slightly more water to obtain a coating which is to be applied by spraying than for a coating to be applied by brushing or dipping, but this type of viscosity reduction is, of course, well known to those skilled in the art of ordinary latex paints. In any case, the mixture should be blended for approximately 3 minutes after the last addition of resin or water. To illustrate the application and curing of this material, the black paint so prepared was brushed onto the surface of several aluminum panels and the panels placed under an ordinary infrared lamp located approximately 12 inches away. Such heating maintained the exposed surface at a temperature of 60 to 70° C. Within about 10 to 20 minutes, the water and toluene had evaporated and the normal curing reactions began within the dry coating. Within 4 to 6 hours, the coating had cured sufficiently to possess excellent cohesion, hardness and abrasion resistance. As is the usual case with epoxy coatings, complete cure probably required several additional days at room temperature.

The boron carbide base paint so produced possessed unusual radiation absorption properties, rendering it useful for coating certain aerospace vehicles.

EXAMPLE 2

Following the same procedure as in Example 1, 100 grams of kaolin having a particle size of about 0.6 micron were dispersed in approximately 200 ml. of water in a Waring blender jar. To this was added a resin mixture containing 10 grams of epoxy resin of the Epon series as defined above, 1.8 grams of amine curing agent (DMP-10), and 5 grams of xylene. Finally, 5 grams of colloidal silica were added and the agitation continued for an additional three minutes. The product was a white, highly reflective paint which was applied by standard techniques to various substrates such as glass, metals, and plastics, and cured in four to eight hours at 80° C. to form a strongly adherent coating. The thickness of the coatings could be varied either by reducing or increasing the quantity of water (decreasing the water increased the viscosity and thereby produced thicker single coatings by brushing or dipping), or by applying multiple coats. In the latter case, it was not necessary to wait until the coating was completely cured before adding subsequent coats since the dried coating possessed the required coherence after about 20 to 30 minutes at 80° C.

This white paint also possessed very high reflectivity to solar radiation, high emissivity in the infra-red and high resistance to damage by ultra-violet radiation, rendering it useful for aerospace vehicles. The high reflectivity and extraordinary whiteness of this paint are believed to be due in large measure to the fact that the cured paint is composed primarily of kaolin and void spaces, so that the difference in the refractive indices at the reflecting surfaces is the difference between 1.58 (for kaolin) and 1 for air or vacuum. In a normal, high resin content, paint film the difference would be that between 1.58 for kaolin and 1.45 to 1.52 for most epoxy resins.

Similar coating compositions were prepared by substituting for kaolin other common opacifying filler particles having a particle size less than 100 mesh such as titanium dioxide, magnesium oxide, talc, bentonite, etc. In such case the finished cured coating displayed predominantly the characteristics of the filler present.

EXAMPLE 3

The procedure of Example 2 was repeated except that before the addition of the epoxy resin mixture, 1.0 gram of ethylenediamine was added to the aqueous slurry. The ethylenediamine was adsorbed on the clay surface, reduced the viscosity of the clay-water slurry, and improved the subsequent degree of adsorption and retention of the epoxy resin mixture. The cured coating possessed identical optical properties, but possessed superior adhesion and cohesive strength to the material produced in Example 2.

EXAMPLE 4

Approximately 100 grams of kaolin were dispersed in 200 grams of water. There was added 1 gram of ethylenediamine and agitation continued. To this slurry was added a resin mixture consisting of 10 grams of epoxy resin of the Epon series as defined above, 3 grams of a curing agent consisting of an eutectic blend of aromatic diamines, and 3 grams of xylene. Finally, 10 grams of colloidal silica were added and the material mixed, applied and dried as before. The coatings were cured in approximately eight hours at 100° C. The coatings were similar to those produced in Example 2 except that the color in this case was not as white (due to the presence of the aromatic amines in the curing agent) and also the cohesive strength of these coatings did not appear to be quite so good as those of Example 2.

EXAMPLE 5

The procedure of Example 2 was repeated except that the resin mixture contained 10 grams of epoxy resin of the Epon series as defined above and 1.5 grams of a curing agent formed by reacting an excess of an aliphatic polyamine with a bisphenol–A type diepoxide. After applying, drying and curing at 80° C. for four hours, this mixture produced a coating whose cohesive and adhesive strengths were approximately equal to those produced via Example 3.

EXAMPLE 6

The same procedure as in Example 3 was carried out except that the resin mixture contained 10 grams of epoxy resin of the Epon series as defined above and 2.2 grams of menthane diamine curing agent. The final coating produced had properties which were very similar to those of Examples 3 and 4.

EXAMPLE 7

It is also possible to use special filler materials which have been converted to organophilic form by the manufacturer, including surface modified kaolinite particles and surface modified bentonites provided a water-soluble amine or surface-active agent is present to facilitate formation of a dispersion. For example, 100 grams of organophilic kaolinite particles were added to 300 ml. of water in a Waring Blendor. This modified clay was not wet by and did not disperse in the water. The addition of 1.0 gram of diethylenetriamine resulted in the immediate formation of a dispersion or suspension. To this was then added a resin mixture containing 10 grams of epoxy resin of the Epon series as defined above, 3 grams of amine curing agent and 3 grams of xylene. Finally, 10 grams of colloidal silica were added with continued agitation as before. The coating slurry could be applied, dried and cured (at 110° C. for four hours) as before to yield a tough, coherent surface coating.

EXAMPLE 8

Ninety grams of water ground mica were blended into 100 ml. of water. A resin mixture containing 9 grams of an epoxy resin of the Epon series as defined above, 1.35 grams of dimethylaminomethylphenol curing agent and 3 grams of xylene was added as before. Finally, 2 grams of colloidal silica were added and agitation continued for an additional three minutes. The slurry was degassed by being placed in a vacuum chamber for five minutes and then was used to dip-coat wires and to form thin films of electrical insulation material. That is, copper and aluminum wires, when passed through the freshly prepared slurry, retained a thin surface film which, when dried and cured four hours at 100° C. provided a tough, inexpensive, electrical insulating coating. To prepare sheets, a coating of the composition was simply dried out and cured on a smooth surface previously sprayed with a mold release agent such as polytetrafluoroethylene. If desired, two or more successive coatings could be applied, all being cured together at 100° C. for four hours. After curing, a thin sheet of epoxy bonded mica was removed from the surface pan. A variety of procedures could be used to form the coating on the surface, including rolling, or extrusion, as well as simple pouring.

EXAMPLE 9

The procedure of Example 1 was repeated to produce an extremely tough, hard and durable coating based on aluminum oxide. In this case, 75 grams of tubular alumina particles passing a 100 mesh screen were added to 24 milliliters of water. Two drops of ethylene diamine were added to facilitate wetting. The resin mixture subsequently added contained 4.5 grams of epoxy resin of the Epon series, 0.45 gram of dimethylaminomethylphenol curing curing agent and 1.5 grams of toluene. The material was applied to aluminum panels and cured as in Example 1.

It was found possible, in these coatings, to vary the mechanical properties by varying relative portions of the epoxy resin and curing agent. If one uses a relatively low proportion of curing agent (e.g. 10 parts curing agent per 100 parts resin) the resultant coatings have improved flexibility and impact strength but have a reduced hardness and abrasion resistance. Conversely, if one uses a higher proportion of curing agent (15 to 20 phr.) the coatings are harder and more abrasion resistant, but are less flexible.

EXAMPLE 10

A unique method has been discovered for producing hard, strongly bonded coatings of powdered metals such as aluminum, having controlled porosity. Approximately 22 grams of water were blended with 50 grams of aluminum powder after which a resin mixture consisting of 3.0 grams an epoxy resin of the Epon series, 0.3 gram, dimethylaminomethylphenol curing agent and 1 gram of toluene was added with continued good agitation. The steps subsequent to the addition of the resin determine the porosity of the finished material. If no porosity is desired, the coating composition is then applied to a surface as in the previous examples, but must be allowed to dry before the application of heat. After the water has been allowed to evaporate from the coatings, moderate infrared heating is applied for 4 to 6 hours, until the resin has cured. A strong, abrasion resistant, non-porous coating is produced.

EXAMPLE 11

If a porous, foam-like material is desired, the coated samples are exposed to moderate infrared heating before the water has evaporated. In this event, the coatings will foam slightly within 10 to 20 minutes after application due to internal hydrogen evolution via the following reaction:

$$Al + 3H_2O \rightarrow Al(OH)_3 + \tfrac{3}{2}H_2 \text{ (gas)}$$

The degree of porosity attainable in this fashion can be varied by varying the pH of the coating composition or by varying the degree of heating. Because of the presence of the amine curing agent the pH of the slurry, after the resin addition, is normally about 9. Decreasing the pH of the slurry (as with oleic acid or acetic acid) or decreasing the amount of heat input will serve to decrease the degree of porosity. This porosity can also be produced using other metals, such as magnesium and beryllium, which lie above hydrogen in the E.M.F. series and which react with water, under alkaline conditions, to generate hydrogen gas.

EXAMPLE 12

The procedure of Example 10 was repeated using 44 grams of aluminum powder and 18 grams of molybdenum disulfide powder (technical grade, 325 mesh) in 30 ml of water. To this was added a resin mixture containing 4.8 grams of an epoxy resin of the Epon series, 0.72 gram dimethylaminomethylphenol curing agent and 1 gram of toluene. The slurry was applied to aluminum panels and allowed to dry in air before the application of heat. A very strong, black coating was produced which is useful as a bearing surfacing material.

Although specific embodiments of the invention have been described herein, it is not intended to limit the invention solely thereto but to include all of the obvious variations and modifications within the spirit and scope of the appended claims.

What is claimed is:
1. The method of forming a durable coating on a substrate which comprises preparing a composition by the steps of
   (1) slurrying, in water, a water-insoluble, non-alkaline particulate filler inert to the remaining ingredients and having a particle size less than 100 mesh, the ratio of water to filler being 10:1 to 1:1 by volume,
   (2) thereupon adding to said slurry an epoxy resin in an amount from 0.7% to 5% by weight of said filler and an amine curing agent having a solubility in water of less than 30% to 20° C. to bring the composition, at shear rates above 100 reciprocal seconds, to an apparent viscosity of between 40 and 1000 centipoises, a yield stress greater than 5 dynes/cm.$^2$, and thixotropic flow behavior,
   (3) applying said composition to a substrate, and
   (4) heating to evaporate said water and cure said resin.
2. The method of claim 1 in which said filler is a metal.
3. The method of claim 1 in which said filler is a metallic oxide.
4. The method of claim 1 in which said filler is a silicate.
5. The method of claim 1 is which said filler is a carbide.
6. The method of claim 1 is which said filler is molybdenum disulfide.

References Cited
UNITED STATES PATENTS 3,105,771  10/1963  Simpson et al.
3,168,488   2/1965  Sommer _____ 260—29.2
3,275,587   9/1966  Weller et al. _____ 260—29.2

MURRAY TILLMAN, Primary Examiner
JOHN C. BLEUTGE, Assistant Examiner

U.S. Cl. X.R.
117—132, 124, 161, 119.6; 260—29.2, 37, 2.5, 18; 252—11